United States Patent
Brown et al.

(10) Patent No.: US 7,089,258 B1
(45) Date of Patent: Aug. 8, 2006

(54) SYSTEM AND METHOD FOR STRUCTURE SUBSET GENERATION FOR MULTIPLE DATABASES

(75) Inventors: Douglas P. Brown, Rancho Santa Fe, CA (US); Sunanda K. Reddy, Escondido, CA (US); Jeetendra Chaware, Secunderabad (IN)

(73) Assignee: NCR Corporation, Dayton, OH (US)

( * ) Notice: Subject to any disclaimer, the term of this patent is extended or adjusted under 35 U.S.C. 154(b) by 344 days.

(21) Appl. No.: 10/056,549

(22) Filed: Jan. 25, 2002

(51) Int. Cl.
*G06F 17/30* (2006.01)

(52) U.S. Cl. .............. 707/102; 707/103 R; 707/103 Z; 707/104.1

(58) Field of Classification Search .......... 707/1–104.1
See application file for complete search history.

(56) References Cited

U.S. PATENT DOCUMENTS

| | | | |
|---|---|---|---|
| 6,115,704 A * | 9/2000 | Olson et al. ................... 707/3 |
| 6,360,228 B1 * | 3/2002 | Sundara et al. ............. 707/102 |
| 6,363,394 B1 * | 3/2002 | Rajarajan et al. ........... 707/102 |
| 6,496,833 B1 * | 12/2002 | Goldberg et al. ........... 707/102 |
| 6,631,519 B1 * | 10/2003 | Nicholson et al. .......... 717/169 |
| 6,640,231 B1 * | 10/2003 | Andersen et al. ........... 707/102 |
| 6,718,320 B1 * | 4/2004 | Subramanian et al. ......... 707/2 |
| 2002/0073089 A1 * | 6/2002 | Schwartz et al. ............. 707/10 |
| 2002/0169745 A1 * | 11/2002 | Hotti et al. |

FOREIGN PATENT DOCUMENTS

EP  1271358 A2 *  2/2003

OTHER PUBLICATIONS

Teradata Magazine, Tech Tip, vol. 4, #1, Copyright 2004 NCR Corporation, pp. 1-4.*
Knutson et al, Evolution of a user interface design: NCR's Management discovery tool (MDT), ACM 1987, pp. 526-533.*
Teradata Warehouse top ten reasons, Teradata a division of NCR, 2003, pp. 1-3.*

* cited by examiner

*Primary Examiner*—Debbie M. Le
(74) *Attorney, Agent, or Firm*—Baker Botts; Steve Stevens

(57) ABSTRACT

A method and computer system for structure subset generation for multiple databases is disclosed. The method retrieves a database view object structure. The method includes inputting definition language specifying a database view identifier and with at least one directly or indirectly referenced database object unqualified with a containing database identifier. The method further includes inputting a show statement that identifies the database view identifier and outputting the definition language with each directly or indirectly referenced database object qualified with its containing database identifier.

33 Claims, 8 Drawing Sheets

| SQL - 1 | DATABASE us; |
|---|---|
| SQL - 2 | CREATE TABLE table_1 (c1 INTEGER); |
| SQL - 3 | CREATE VIEW view_1 AS SELECT * FROM table_1; |
| SQL - 4 | DATABASE international; |
| SQL - 5 | CREATE TABLE table_1 (c1 INTEGER) |
| SQL - 6 | CREATE VIEW view_1 as SELECT * FROM table_1 |
| SQL - 7 | CREATE VIEW view_3 AS SELECT * FROM international.view_1, us.view_1 |

*FIG. 11*

SYSTEM AND METHOD FOR STRUCTURE SUBSET GENERATION FOR MULTIPLE DATABASES

BACKGROUND

Database system providers commonly offer technical support to their customers. As part of this support, the providers assist customers in troubleshooting problems that arise in customer databases, for example, when a SQL query fails. Such technical support can also include developing optimized execution strategies for queries. SQL is the dominant language for managing information in relational databases.

Troubleshooting a failed query can be difficult, since it is often necessary to attempt to reproduce the problem, possibly in the system provider's laboratory. This may require the system provider to retrieve from the customer the definitions of any objects associated with the query, including definitions of objects that are in turn referenced by these definitions. It also may require capturing configuration information regarding the computer system and a statistical view of data in the database. Developing optimized execution strategies for queries can also be performed in a test system based on the configuration information and a statistical view of data in a target system.

To obtain the definitions, the technical support provider typically identifies each database object associated with the query, for example as a table or a view. The provider then executes an appropriate SQL command for the object, which returns the object definition. For example, in the Teradata Active Data Warehousing System, available from NCR Corporation, a SHOW TABLE command returns the definition of a table in the form of the data definition language (DDL) necessary to create the table. Similarly, the SHOW VIEW, SHOW MACRO, SHOW TRIGGER, and SHOW JOIN INDEX commands return the definitions of those database objects. The database object definitions are stored in a data dictionary (DD). The provider then identifies each object referenced within the retrieved definition, obtains definitions for those objects, and repeats the process. This continues until the provider believes that all of the necessary object definitions have been obtained. For some database objects, such as triggers and join indexes, the association of the database object with the query may only become apparent upon examination of the data dictionary.

The definitions may then be transferred to a computer in the system provider's laboratory. Possible difficulties arise when insufficient object definitions are obtained, either by the provider or by the customer, either of whom may have insufficiently stated or understood the problem or the desired optimization. The provider may discover that definitions were not obtained for objects referenced in the definition of another object, in which case additional information must be obtained from the customer's database system. In a situation such as this, it may take multiple contacts with the customer over a period of several days to obtain the necessary information. Such multiple contacts may produce customer dissatisfaction with the service provided. Furthermore, the customer may alter one or more object definitions between the time the customer identifies the problem or the desired optimization and the time the definitions are gathered. If the customer's alterations eliminate the problem, the service provider may spend a great deal of time trying to solve a problem that no longer exists using the gathered definitions. If the customer's alterations change the system, the service provider may spend a great deal of time optimizing a query using the gathered definitions that is not optimized for the new system configuration.

A database system can include multiple databases each having tables and other objects with identifiers that are not unique across the multiple databases. For example, a table in one 3 database can have the same name as a table in another database. The SQL DDL statement that defines a particular database object, for example a database view, does not require specification of the databases that contain the objects that are directly or indirectly referenced by the DDL. Obtaining definitions of the referenced objects with the identical identifier in an incorrect database can result in an incorrect reproduction of the problem that resulted in the failed query or an incorrect reproduction of the environment in which a query is to be optimized.

SUMMARY

In general, in one aspect, the invention features a method for copying a portion of a database structure, the database including one or more database objects. The method includes recursively retrieving object definitions for one or more database objects associated with a query to produce an ordered set of object definitions, wherein at least one of the database objects is a view and the object definition for the view is qualified with a containing database identifier. The method further includes building a copy of the database structure using the ordered set of object definitions.

Implementations of the invention may include one or more of the following. Recursively retrieving object definitions may include recursively identifying objects associated with the query, categorizing each identified object into a category, and retrieving an object definition for each identified object using a tool corresponding to the category with which the identified object is connected. The categories may include tables, views, join indexes, triggers and macros. The tool may be a SHOW VIEW statement if the identified object is categorized as a view, a SHOW TABLE statement if the identified object is categorized as a table, a SHOW JOIN INDEX statement if the identified object is categorized as a join index, a SHOW TRIGGER statement if the identified object is categorized as a trigger, or a SHOW MACRO statement if the identified object is categorized as a macro.

Recursively retrieving object definitions may include retrieving unretrieved object definitions for a set of objects known to be associated with the query, adding to the set of objects known to be associated with the query those objects contained in the retrieved object definitions that are not already in the set of objects known to be associated with the query, and repeating these two items until no new objects are added to the set of objects known to be associated with the query.

The method may include sending the ordered set of object definitions from a first computer to a second computer. The order of the ordered set of object definitions may also be changed. Changing the order may include reordering the object definitions so that each object definition is ordered before the definition of any object that references it. The object definitions may be ordered so that each object definition is ordered before the definition of any object that references it.

Recursively retrieving object definitions for one or more database objects may include looking for references to the one or more database objects in a data dictionary. In one implementation, the object definition for the view is qualified with the containing database identifier in response to a deviation from a default condition.

In general, in another aspect, the invention features a computer-readable medium containing computer-executable code for instructing a computer to recursively retrieve object definitions for one or more database objects associated with a query to produce an ordered set of object definitions, wherein at least one of the database objects is a view and the object definition for the view is qualified with a containing database identifier. The computer-executable code includes computer-executable code for instructing a computer to build a copy of the database structure using the ordered set of object definitions.

Implementations of the invention may include one or more of the following. The computer-executable code, when recursively retrieving object definitions, may instruct the computer to recursively identify objects associated with the query and categorize each identified object into a category. The computer-executable code may then retrieve an object definition for each identified object using a tool corresponding to the category with which the identified object is connected. The categories may include tables, views, join indexes, triggers and macros. The tool may be a SHOW VIEW statement if the identified object is categorized as a view, a SHOW TABLE statement if the identified object is categorized as a table, a SHOW JOIN INDEX statement if the identified object is categorized as a join index, a SHOW TRIGGER statement if the identified object is categorized as a trigger, or a SHOW MACRO statement if the identified object is categorized as a macro.

The computer-executable code may instruct the computer, when recursively retrieving object definitions, to retrieve unretrieved object definitions for a set of objects known to be associated with the query, and may add to the set of objects known to be associated with the query those objects contained in the retrieved object definitions that are not already in the set of objects known to be associated with the query. The code may repeat these instructions until no new objects are added to the set of objects known to be associated with the query.

The computer-executable code may instruct the computer to send the object definitions from a first computer to a second computer. The code may instruct the computer to change the order of the ordered set of object definitions. The computer may be instructed to reorder the object definitions so that each object definition is ordered before the definition of any object that references it. The computer may be instructed to store the definitions so that each object definition is ordered before the definition of any object that references it.

The computer-executable code may instruct the computer, when recursively retrieving object definitions for one or more database objects, to look for references to the one or more database objects in a data dictionary. In one implementation, the object definition for the view is qualified with the containing database identifier in response to a deviation from a default condition.

In general, in another aspect, the invention features a package of data useful in building a copy of a database structure. The package is generated in accordance with the act of recursively retrieving object definitions for one or more database objects associated with a query to produce an ordered set of object definitions, wherein at least one of the database objects is a view and the object definition for the view is qualified with a containing database identifier.

Implementations of the invention may include one or more of the following. The object definitions may be recursively retrieved in accordance with the acts of recursively identifying objects associated with the query, categorizing each identified object into a category, retrieving an object definition for each identified object using a tool corresponding to the category with which the identified object is connected. The categories may include tables, views, join indexes, triggers and macros. The tool may be a SHOW VIEW statement if the identified object is categorized as a view, a SHOW TABLE statement if the identified object is categorized as a table, a SHOW JOIN INDEX statement if the identified object is categorized as a join index, a SHOW TRIGGER statement if the identified object is categorized as a trigger, or a SHOW MACRO statement if the identified object is categorized as a macro.

The object definitions may be recursively retrieved in accordance with the acts of retrieving unretrieved object definitions for a set of objects known to be associated with the query, adding to the set of objects known to be associated with the query those objects contained in the retrieved object definitions that are not already in the set of objects known to be associated with the query, and repeating until no new objects are added to the set of objects known to be associated with the query.

The implementation may include the act of sending the ordered set of object definitions from a first computer to a second computer, as well as the act of instructing the computer to change the order of the ordered set of object definitions. The act of changing the order of the ordered set of object definitions may include reordering the object definitions so that each object is ordered before the definition of any object that references it.

The act of storing object definitions may include storing the object definitions so that each object definition is ordered before the definition of any object that references it.

The act of recursively retrieving object definitions for one or more database objects may include looking for references to the one or more database objects in a data dictionary.

In general, in another aspect, the invention features a method for retrieving a database view object structure. The method includes inputting definition language specifying a database view identifier and with at least one directly or indirectly referenced database object unqualified with a containing database identifier. The method further includes inputting a show statement that identifies the database view identifier and outputting the definition language with each directly or indirectly referenced database object qualified with its containing database identifier. In one implementation, the show statement includes an option indicator. In a more specific implementation, the option indicator is the term qualified.

Other features and advantages will become apparent from the description and claims that follow.

DETAILED DESCRIPTION

Figure 1:
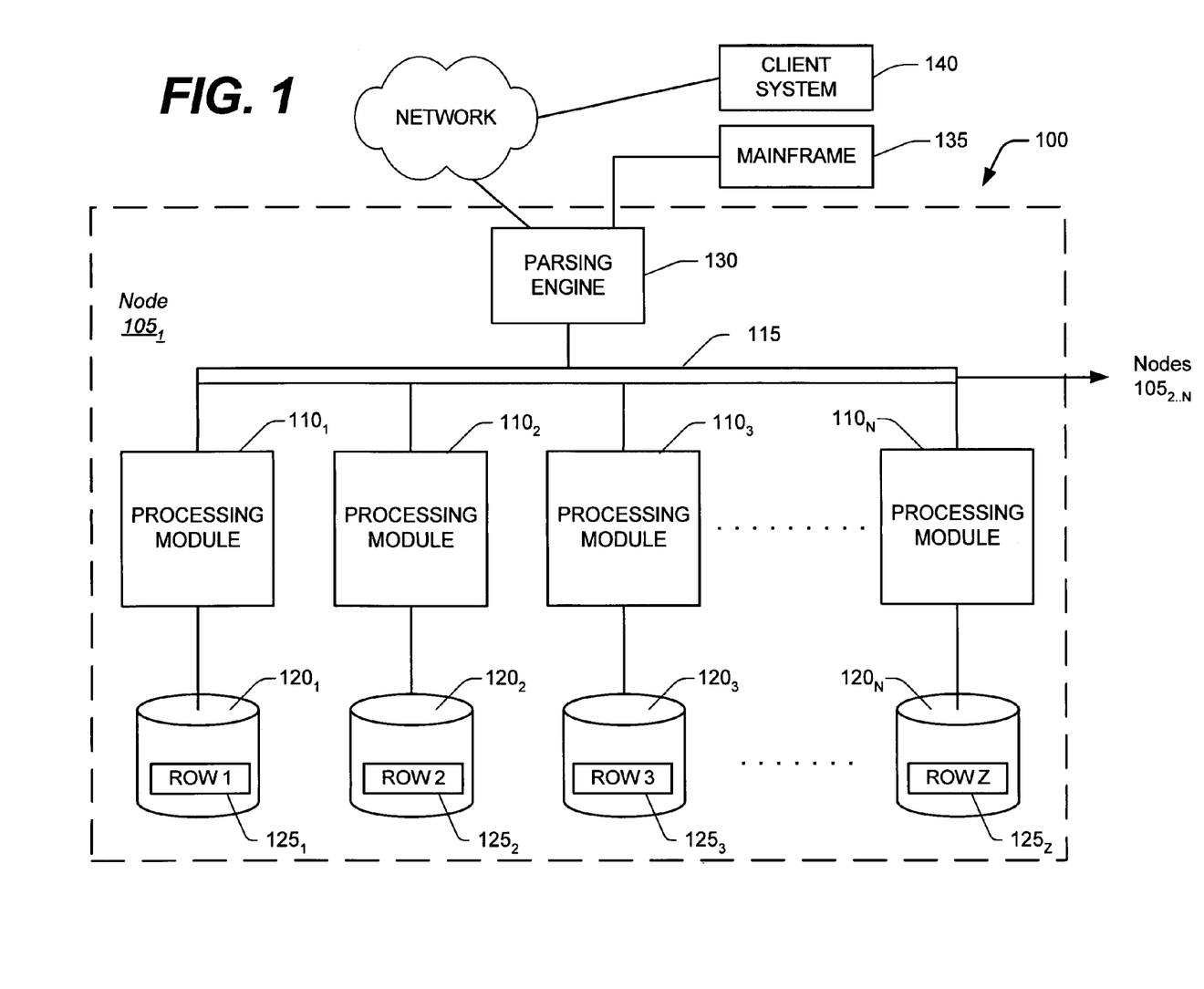
FIG. 1 is a block diagram of a node of a database system.

The database object retrieval technique disclosed herein has particular application to large databases which might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1\ldots N}$, connected by a network 115, that manage the storage and retrieval of data in data-storage facilities $120_{1\ldots N}$. Each of the processing modules $110_{1\ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

Each of the processing modules $110_{1\ldots N}$ manages a portion of a database that is stored in a corresponding one of the data-storage facilities $120_{1\ldots N}$. Each of the data-storage facilities $120_{1\ldots N}$ includes one or more disk drives. The DBS may include multiple nodes $105_{2\ldots N}$ in addition to the illustrated node $105_1$, connected by extending the network 115.

The system stores data in one or more tables in the data-storage facilities $120_{1\ldots N}$. The rows $125_{1\ldots Z}$ of the tables are stored across multiple data-storage facilities $120_{1\ldots N}$ to ensure that the system workload is distributed evenly across the processing modules $110_{1\ldots N}$. A parsing engine 130 organizes the storage of data and the distribution of table rows $125_{1\ldots Z}$ among the processing modules $110_{1\ldots N}$. The parsing engine 130 also coordinates the retrieval of data from the data-storage facilities $120_{1\ldots N}$ in response to queries received from a user at a mainframe 135 or a client computer 140. The DBS 100 usually receives queries in a standard format, such as SQL.

Figure 2:
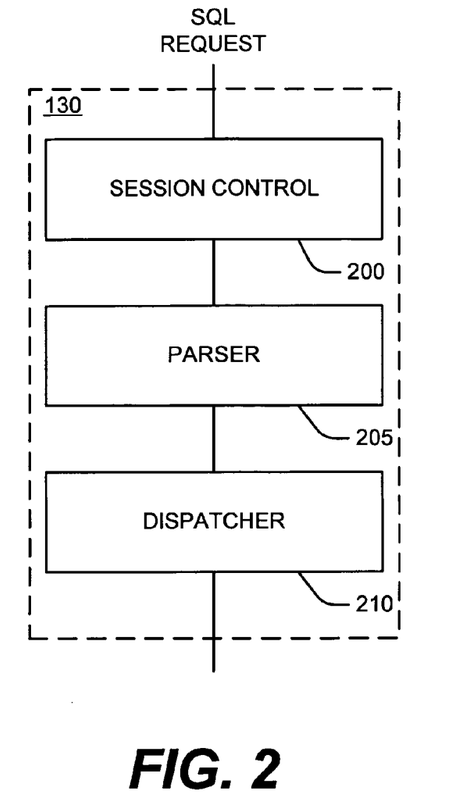
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
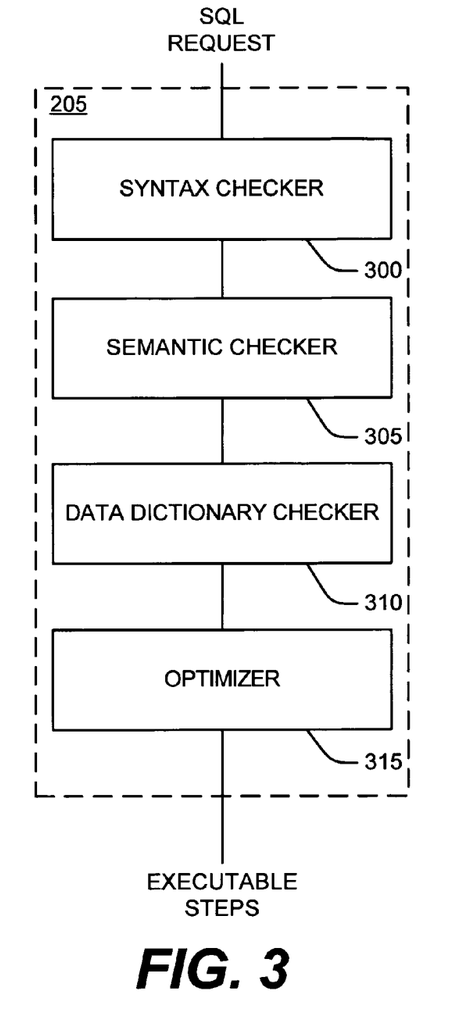
FIG. 3 is a flow chart of a parser.

Once the session control 200 allows a session to begin, a user may submit a SQL request, which is routed to the parser 205. As illustrated in FIG. 3, the SQL request is checked for proper SQL syntax (block 300), evaluated semantically (block 305), and checked in the data dictionary to ensure that all of the objects specified in the SQL request actually exist and that the user has the authority to perform the request (block 310). Finally, the parser 205 runs an optimizer (block 315), which develops the least expensive plan to perform the request.

Figure 4:
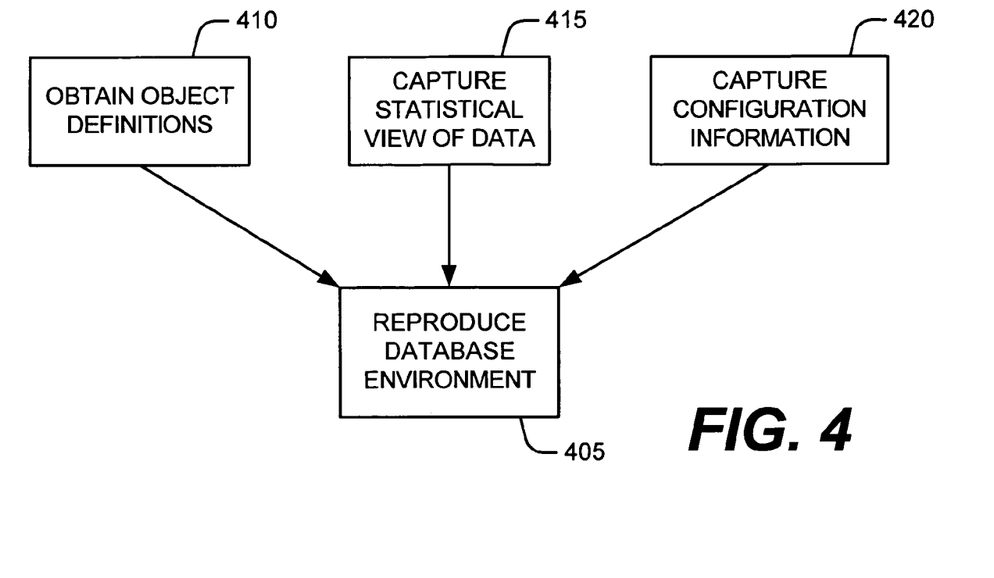
FIG. 4 is a block diagram of a method for reproducing a portion of a multiple database environment.

As depicted in FIG. 4, the process of reproducing a database environment (block 405) may include several steps: obtaining object definitions of data in a database (block 410); capturing a statistical view of data in the database (block 415); and capturing configuration information concerning the database (block 420). The system described herein automates the step of obtaining object definitions (block 410). The other processes (blocks 415 and 420) are outside the scope of this disclosure. The system provides in one automated procedure a complete list of object definitions. By performing this function, the system can help reduce the time between identification of a problem by a customer and obtaining the object definitions necessary to troubleshoot the problem.

Figure 6:
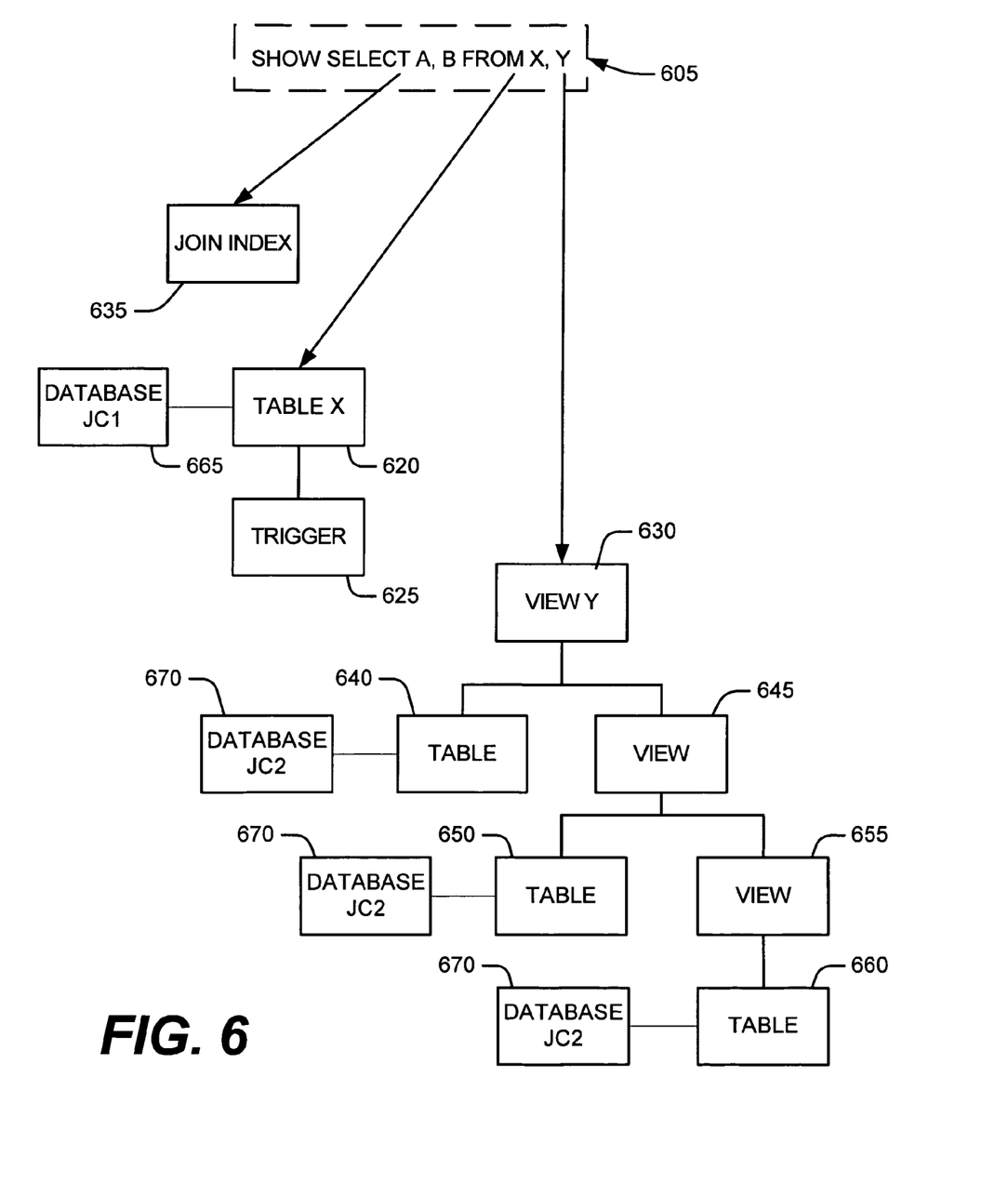
FIG. 6 is a block diagram of an example of the structure of a query and the database elements it references.

The automated process of obtaining database object definitions typically begins with a SQL command 605, e.g., SHOW SELECT A, B FROM X, Y, as shown in FIG. 6. The command 605 may contain the failed query, in this case "SELECT A, B FROM X, Y." This type of query is often called a Data Manipulation Language (DML) statement, and command 605 may be called a "SHOW DML statement." Although command 605 is available to all users of the system, for security reasons the user issuing the SHOW DML statement must have permission to access the database objects associated with the query, which may be any object in the database. An object is "associated" with a query if the object appears in the query itself or appears in the definition of an associated object or is somehow associated with the query through the data dictionary. FIG. 6 displays the database objects that are associated with this example query. Table X object 620 is associated with the query because it explicitly appears in the query. Trigger 625 is associated with the query because it appears in the data dictionary as code to be implemented when defined changes occur to data contained in Table X 620, as signified by the line connecting the two boxes. View Y 630 is associated with the query because it is explicitly included in the query 605. The association of a join index 635 is revealed upon examination of the data dictionary. A table 640 and a view 645 are associated with the query because they are included in the definition of View Y 630. Similarly, a table 650 and a view 655 are associated with the query because they are included in the definition of the view 645, and table 660 is associated with the query because it is included in the definition of the view 655.

The database objects can be contained by different databases. In the example of FIG. 6, Table X 620 is contained in Database JC1 665. The table 640 included in the definition of View Y 630 is contained in Database JC2 670. The table 650 included in the definition of view 645 is also contained in Database JC2 670. The table 680 included in the definition of view 655 is also contained in Database JC2 670. In one example, the table 640 included in the definition of View Y 630 is also identified as Table X without conflict because it is contained in a different database than Table X 620.

In existing technical support environments, the technical support staff will execute successive SHOW statements and queries into the data dictionary to find the definitions of objects associated with the query. The system disclosed herein automates this process by recursively retrieving object definitions for objects known to be associated with a query, and adding to a set of objects known to be associated with the query any new objects identified in the retrieved definitions.

Figure 5:
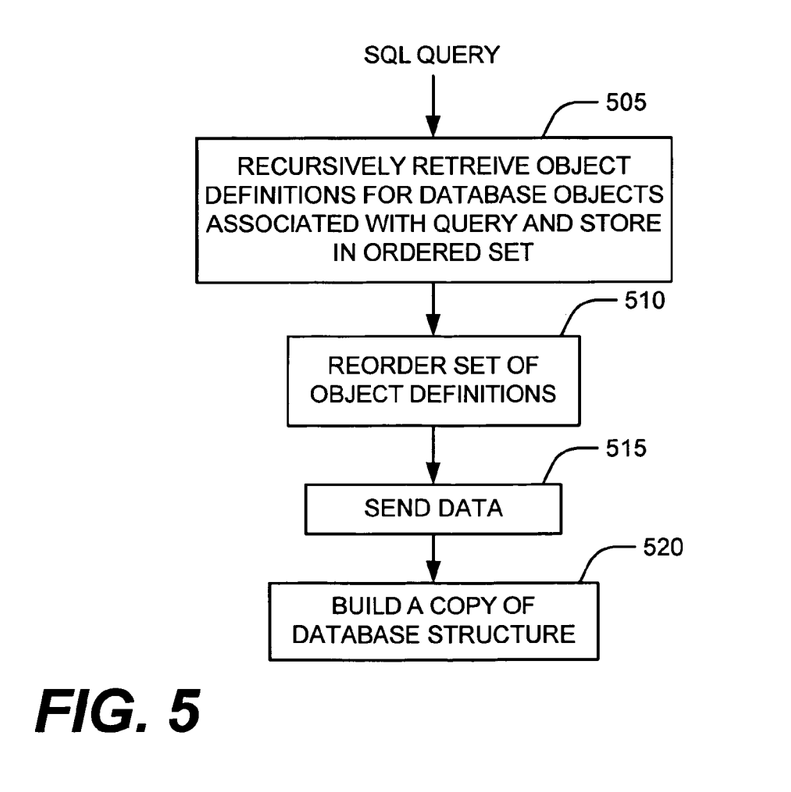
FIG. 5 is a flow chart of a method for displaying underlying database objects.

The automated system recursively retrieves object definitions for database objects associated with the SQL query, as shown in FIG. 5, and stores the object definitions in an ordered set, for example in a file (block 505).

Frequently, the order of the object definitions within the file will not be convenient, in the sense that the file could not be used to recreate the database in a single submission to the database creation process. In one example system, the object definitions are reordered within the file (block 510) so that, if this file were submitted to the database creation process, the definition of each database object would output before the definitions of any objects that reference it. This is an optional step, because the effect of reordering the object definitions within the file could be accomplished by repeatedly submitting the file to the database creation process (block 520) until no error messages are returned. Each successive submission would create that portion of the database that it was possible to create given the database structure already in place. The submissions would continue until the structure is complete. Alternatively, the object definitions could be manually reordered within the file. In still another alternative, an automated process could be applied to reorder the object definitions within the file.

In most cases, the file containing the ordered (or reordered, if block 510 is applied) set of object definitions is sent to another computer (block 515) using a computer utility such as email or FTP. This may happen automatically or as the result of human intervention. In one example, the definitions may be obtained on a customer's computer and then transmitted to a system provider's computer. Alternatively, the set of object definitions may be displayed on a screen or saved to a file. In some cases, the file is not sent to another computer and the database is rebuilt on the same computer.

Finally, the object definitions are used to create a copy of the database structure (block 520) by submitting the file to a database creation process.

Figure 7:
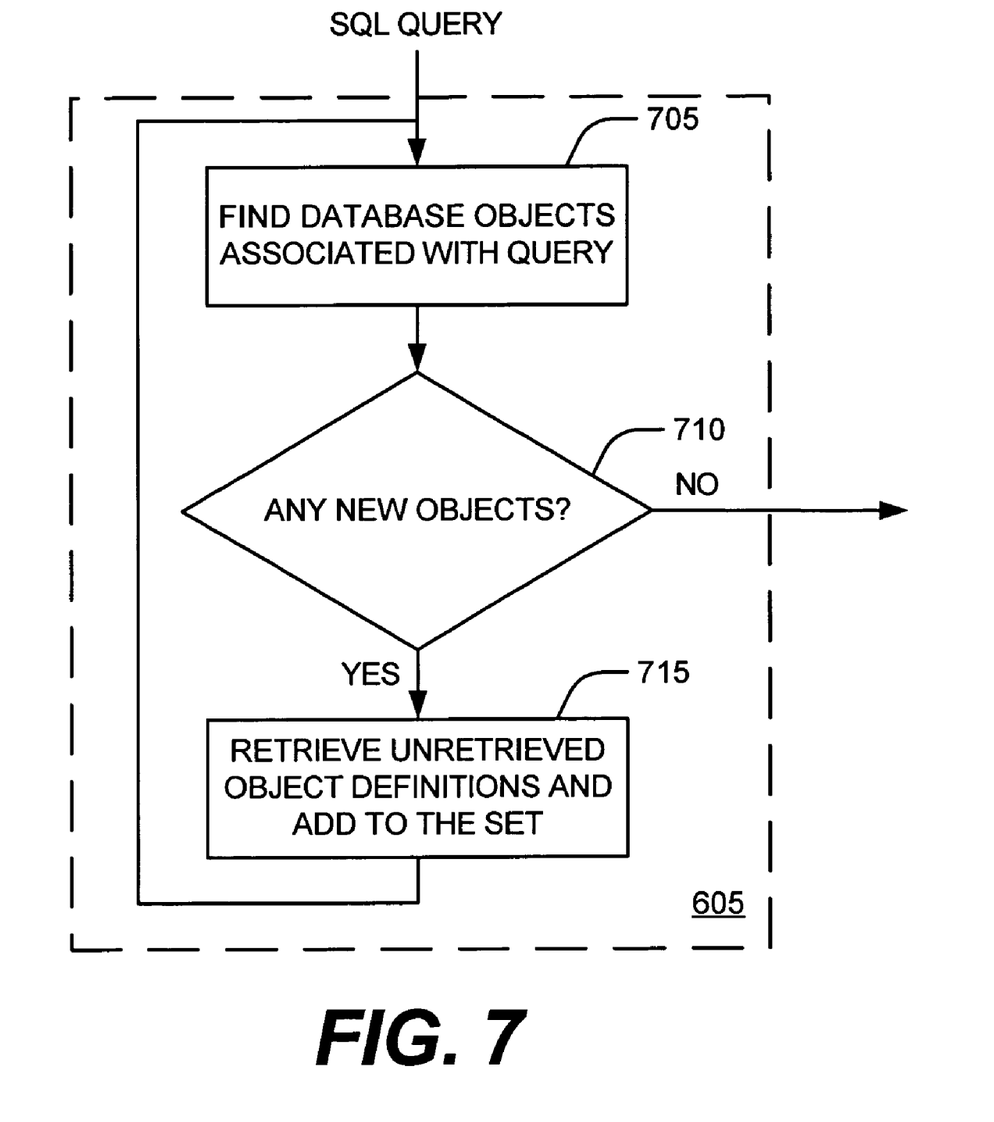
FIG. 7 is a flow chart of a method for finding and obtaining definitions for database objects associated with a query.

The process of recursively retrieving object definitions for database objects associated with a query, illustrated in more detail in FIG. 7, includes identifying database objects associated with the query (block 705). If any new objects were identified (block 710), object definitions for the new objects are retrieved and added to the set of object definitions associated with the query (block 715). A number of methods for recording which database objects are new are possible. For example, the system may maintain a set of objects known to be associated with the query. The set may be in a file where the database objects are stored as they are discovered. When the system encounters a database object it checks the file. If the database object is not in the file, the system will add the database object to the file of database objects. Furthermore, the ordered set of database object definitions may be a file with the object definitions stored sequentially as they are discovered, in which case the set of objects associated with the query may be the database objects listed in the file of object definitions. Other ways of recording the database object definitions will be apparent without further discussions.

For the first pass through the iterative process illustrated in FIG. 7, the system will find the database objects explicitly identified in the query or that are tied to those database objects through the data dictionary. For example, in the query 505 illustrated in FIG. 5, the process will find Table X 520 and View Y 530 in the first pass. Since these are new objects (block 710), the system will retrieve their object definitions and start the ordered set of object definitions associated with the query. The system would examine the data dictionary and find that a join index 535 has been created that might be useful in executing the query because it covers all or a portion of Table X 520 or View Y 530. Consequently, the join index would be identified as a database object associated with the query and its definition would be added to the ordered set. Similarly, upon examination of the data dictionary, the system would identify trigger 525 as a database object associated with the query because of its tie to Table X 520. Consequently, the trigger's definition would be added to the ordered set. In subsequent passes, the system searches for new database objects identified in the object definitions in the ordered set (block 705). If any are found (block 710), their object definitions are retrieved and added to the ordered set (block 715). This process repeats until no new objects are found.

For example, continuing with the structure illustrated in FIG. 5, the system would examine the object definitions present in the ordered set and would find table 540 and view 545 in the definition of View Y 530. Consequently, their definitions would be added to the ordered set. In the next pass, the system would find table 550 and view 555 in the definition of view 545 and their definitions would be added to the ordered set. In the next pass, the system would find table 560 in the definition of view 555 and its definition would be added to the ordered set. In the next pass, no new objects would be found and the process of recursively retrieving database object definitions (block 605 in FIG. 6) would be complete.

Figure 8:
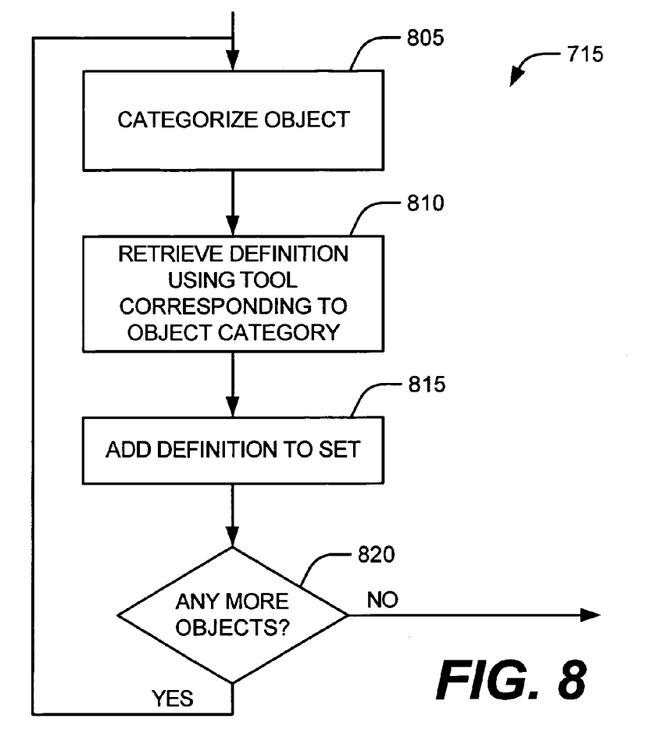
FIG. 8 is a flow chart of a method for obtaining object definitions.

An example of the process of retrieving unretrieved object definitions and adding them to the ordered set (block 715), illustrated in more detail in FIG. 8, begins by categorizing the object (block 805). In one example system, a database object can be a table, a view, a trigger, a macro or a join index. The system then retrieves the object definition for the database object using a tool corresponding to the object's category (block 810). The system then adds the object definition to the ordered set (block 815). The system repeats this process until no more objects are left (block 820).

Figure 9:
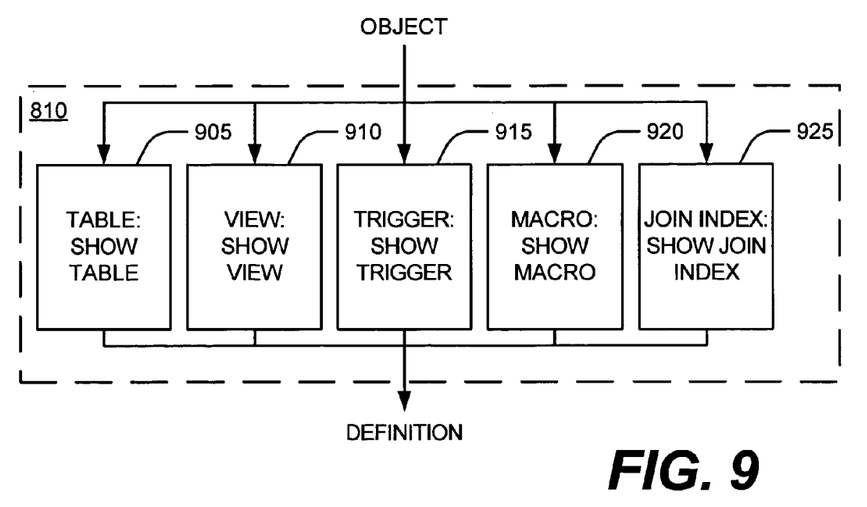
FIG. 9 is a flow chart of a method for retrieving object definitions.

Objects are categorized (block 805) so that the correct tool may be used to retrieve the object's definition (block 810). An example set of possible tools for various object categories (blocks 905–925), illustrated in FIG. 9, includes SHOW TABLE (block 905), SHOW VIEW (block 910), SHOW TRIGGER (block 915), SHOW MACRO (block 920), and SHOW JOIN INDEX (block 925).

Finally, the portion of the database structure may be rebuilt from the database's retrieved object definitions, and optionally, the statistical view of the data, and the configuration information concerning the system (block 625). The statistical view of the data and the configuration information are provided by other portions of the system not described herein. After the structure is rebuilt, it may be necessary to populate the database with data before running the query.

Figure 10:
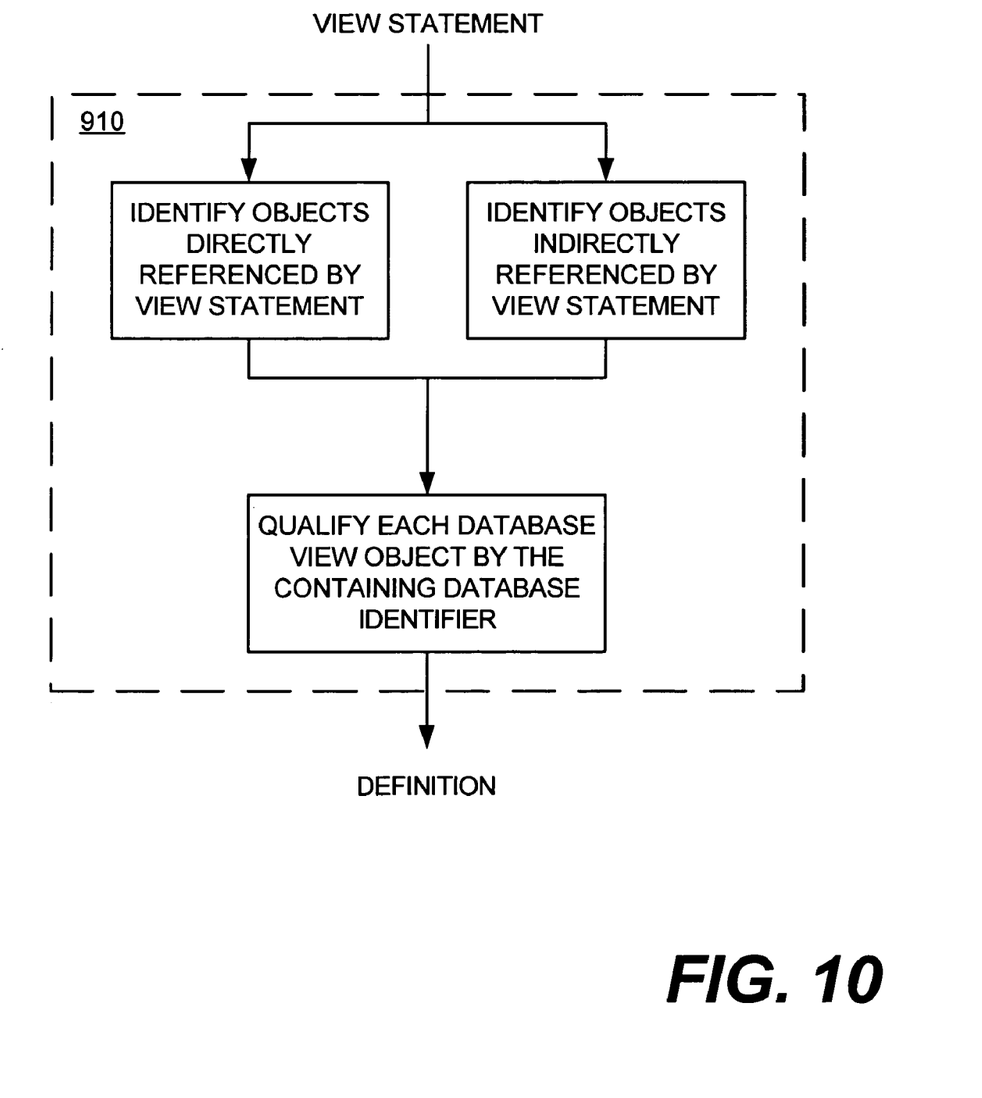
FIG. 10 is a flow chart of a method for retrieving database view definitions.
Figure 11:
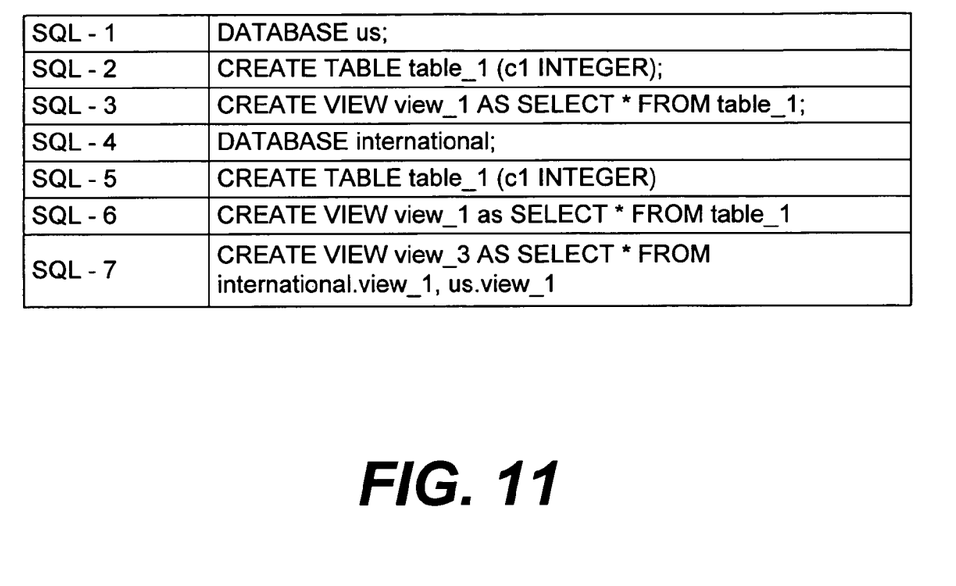
FIG. 11 is a table of example SQL data definition language.

A specific example of retrieving an object definition 910 for a database view object is depicted in FIG. 10. Objects directly referenced by the view are identified 1010 as well as objects indirectly referenced by the view 1015. Both directly and indirectly referenced objects are then qualified by the identifier of the database that contains that object 1020. The resulting definition of the database view statement can be recursively processed as discussed above, even if database objects from multiple databases are being referenced. Recursively processing identical identifiers from different databases without database qualification can lead to inaccurate results.

In one implementation, one database system table stores the SQL DDL statements that resulted in the creation of database system objects. For example, in the Teradata Active Data Warehousing System available from NCR Corporation the DBC.TVM.RequestText table stores the DDL that generated each database object. A different database system table stores at least the database relationships of database system objects. For example, in the Teradata system the DBC.TVM.CreateText table stores that information. In this implementation directly and indirectly referenced objects are looked up in the DBC.TVM.CreateText table and the associated database identifier is read. The database object is then qualified by that database identifier in the definition.

The syntax of the SHOW statement discussed above, in accordance with one embodiment, is described below. The SHOW statement has the following syntax:

SHOW [QUALIFIED]<dml statement>;

The acronym dml represents data manipulation language. The dml statement identifies the database view object whose DDL statement is to be returned, for example "SELECT * FROM view_1" is a dml statement that identifies the database view object view_1. The QUALIFIED option is used to toggle whether the returned DDL statement will include database identifiers for each directly and indirectly referenced object.

SQL DDL statement that creates a view that directly and indirectly references multiple databases is shown in FIG. 10. In SQL-2 and SQL-5, tables with the same identifier, table_1, are created in two databases: us and international. In SQL-3 and SQL-6, views with the same identifier, view_1, are then created in the two databases, each view associated with the table of its own database. A third view, view_3, is created in the international database, but references both view_1 of the us database and view_1 of the international database. The QUALIFIED option of the SHOW statement becomes important with such multiple dependencies. For example, in one implementation, the following is a SHOW statement identifying the view_3 object and not including the QUALIFIED option.

---
SHOW SELECT * FROM view_3;
*** Text of DDL statement returned.
*** Total elapsed time was 1 second.
---
CREATE SET TABLE international.table_1 ,NO FALLBACK ,
NO BEFORE JOURNAL,
NO AFTER JOURNAL
(
c1 INTEGER)
PRIMARY INDEX ( a );
*** Text of DDL statement returned.
---
CREATE SET TABLE us.table_1 ,NO FALLBACK ,
NO BEFORE JOURNAL,
NO AFTER JOURNAL
(
c1 INTEGER)
PRIMARY INDEX ( c1 );
*** Text of DDL statement returned.
---
CREATE VIEW view_1 AS SELECT * FROM table_1;
*** Text of DDL statement returned.
---
CREATE VIEW view_1 AS SELECT * FROM table_1;
*** Text of DDL statement returned.
---
CREATE VIEW view_3 AS SELECT * FROM international.view_1, us.view_1;
---

Neither of the referenced view_1 definitions is qualified by the name of its containing database. Attempts to define the table_1, for example using a SHOW TABLE statement, would result in potentially inaccurate results due to the lack of specificity. For example, in one implementation, the following is a SHOW statement identifying the view_3 object and including the QUALIFIED option.

---
SHOW QUALIFIED SELECT * FROM view_3;
*** Text of DDL statement returned.
*** Total elapsed time was 1 second.
---
CREATE SET TABLE international.table_1 ,NO FALLBACK ,
NO BEFORE JOURNAL,
NO AFTER JOURNAL
(
c1 INTEGER)
PRIMARY INDEX ( a );
*** Text of DDL statement returned.
---
CREATE SET TABLE us.table_1 ,NO FALLBACK ,
NO BEFORE JOURNAL,
NO AFTER JOURNAL
(
c1 INTEGER)
PRIMARY INDEX ( c1 );
*** Text of DDL statement returned.
---
CREATE VIEW "international"."view_1" AS SELECT * FROM "international"."table_1";
*** Text of DDL statement returned.
---
CREATE VIEW "us"."view_1" AS SELECT * FROM "us"."table_1";
*** Text of DDL statement returned.
---
CREATE VIEW "international"."view_3" AS SELECT * FROM "international"."view_1"."c1", "us"."view_1"."c1";
---

Each of the definitions of view_1 are qualified by the containing database. Alternate implementations of the above-described statements using different syntax are contemplated for different database systems. In one implementation, the SHOW statement qualifies database objects with the containing database unless an option is included.

In addition to being useful for troubleshooting a failed query or optimizing a query, this method may also be helpful to a database administrator who wishes, for example, to quickly retrieve multiple table definitions to analyze a particular query.

This method can also be implemented on massively parallel processing (MPP) systems, which allow for more complex database structures. In an MPP environment, retrieving a portion of the database structure for a query may involve hundreds of object definitions. Therefore, being able to easily retrieve this structure automatically is more critical than on simpler systems with simpler database structures.

While particular preferred embodiments of the present invention have been described, it is not intended that these details should be regarded as limitations on the present invention, except to the extent that they are included in the following claims.

We claim:

1. A method for copying a portion of a multiple database structure, the database including one or more database objects, the method comprising:

recursively identifying and categorizing one or more database objects associated with a query;

recursively retrieving an object definition for each identified object using a tool corresponding to the category with which the identified object is connected to produce an ordered set of object definitions, wherein at least one of the database objects is a view and the object definition for the view is qualified with a containing database identifier; and generating a copy of the portion of the multiple database structure using the ordered set of object definitions.

2. The method of claim 1, where the categories include tables, views, join indexes, triggers and macros.

3. The method of claim 1, where the tool is:
   a. a SHOW VIEW statement if the identified object is categorized as a view;
   b. a SHOW TABLE statement if the identified object is categorized as a table;
   c. a SHOW JOIN INDEX statement if the identified object is categorized as a join index;
   d. a SHOW TRIGGER statement if the identified object is categorized as a trigger;
   e. a SHOW MACRO statement if the identified object is categorized as a macro.

4. The method of claim 1, where recursively retrieving object definitions includes
   a. retrieving unretrieved object definitions for a set of objects known to be associated with the query;
   b. adding to the set of objects known to be associated with the query those objects contained in the retrieved object definitions that are not already in the set of objects known to be associated with the query;
   c. repeating items a and b until no new objects are added to the set of objects known to be associated with the query.

5. The method of claim 1, further comprising sending the ordered set of object definitions from a first computer to a second computer.

6. The method of claim 1, further comprising changing the order of the ordered set of object definitions.

7. The method of claim 6, where changing the order of the ordered set of object definitions includes reordering the object definitions so that each object definition is ordered before the definition of any object that references it.

8. The method of claim 1, where the object definitions are ordered so that each object definition is ordered before the definition of any object that references it.

9. The method of claim 1, where recursively retrieving object definitions for one or more database objects includes looking for references to the one or more database objects in a data dictionary.

10. The method of claim 1, where the object definition for the view is qualified with the containing database identifier in response to a deviation from a default condition.

11. A computer-readable medium containing computer-executable code for instructing a computer to:
   recursively identify and categorize one or more database objects included in a multiple database system associated with a query;
   recursively retrieve an object definition for each identified object using a tool corresponding to the category with which the identified object is connected to produce an ordered set of object definitions, wherein at least one of the database objects is a view and the object definition for the view is qualified with a containing database identifier; and
   generate a copy of a portion of the multiple database structure using the ordered set of object definitions.

12. The computer-executable code of claim 11, where the categories include tables, views, join indexes, triggers and macros.

13. The computer-executable code of claim 11, where the tool is:
   a. a SHOW VIEW statement if the identified object is categorized as a view;
   b. a SHOW TABLE statement if the identified object is categorized as a table;
   c. a SHOW JOIN INDEX statement if the identified object is categorized as a join index;
   d. a SHOW TRIGGER statement if the identified object is categorized as a trigger;
   e. a SHOW MACRO statement if the identified object is categorized as a macro.

14. The computer-executable code of claim 11, in which, when recursively retrieving object definitions, the computer:
   a. retrieves unretrieved object definitions for a set of objects known to be associated with the query;
   b. adds to the set of objects known to be associated with the query those objects contained in the retrieved object definitions that are not already in the set of objects known to be associated with the query;
   c. repeats items a and b until no new objects are added to the set of objects known to be associated with the query.

15. The computer-executable code of claim 11, further comprising computer-executable code instructing the computer to send the object definitions from a first computer to a second computer.

16. The method of claim 11, further comprising computer-executable code instructing the computer to change the order of the ordered set of object definitions.

17. The computer-executable code of claim 16, in which, when changing the order of the ordered set of object definitions, the computer reorders the object definitions so that each object definition is ordered before the definition of any object that references it.

18. The computer-executable code of claim 11, in which, when storing the definitions, the computer stores the definitions so that each object definition is ordered before the definition of any object that references it.

19. The computer executable code of claim 11, in which, when recursively retrieving object definitions for one or more database objects, the computer looks for references to the one or more database objects in a data dictionary.

20. The computer executable code of claim 11, in which the object definition for the view is qualified with the containing database identifer in response to a deviation from a default condition.

21. A package of data useful in generating a copy of a portion of a multiple database structure generated in accordance with the following act:
   recursively identifying and categorizing one or more database objects associated with a query;
   recursively retrieving an object definition for each identified object associated with the query using a tool corresponding to the category with which the identified object is connected to produce an ordered set of object definitions, wherein at least one of the database objects is a view and the object definition for the view is qualified with a containing database identifier; and
   generating a copy of the portion of the multiple database structure using the ordered set of object definitions.

22. The package of data of claim 21, where the categories include tables, views, join indexes, triggers and macros.

23. The package of data of claim 21, where the tool is:
   a. a SHOW VIEW statement if the identified object is categorized as a view;
   b. a SHOW TABLE statement if the identified object is categorized as a table;
   c. a SHOW JOIN INDEX statement if the identified object is categorized as a join index;
   d. a SHOW TRIGGER statement if the identified object is categorized as a trigger;

e. a SHOW MACRO statement if the identified object is categorized as a macro.

24. The package of data of claim 21, where the object definitions are recursively retrieved in accordance with the following acts:
   a. retrieving unretrieved object definitions for a set of objects known to be associated with the query;
   b. adding to the set of objects known to be associated with the query those objects contained in the retrieved object definitions that are not already in the set of objects known to be associated with the query;
   c. repeating items a and b until no new objects are added to the set of objects known to be associated with the query.

25. The package of data of claim 21, further comprising the act of sending the ordered set of object definitions from a first computer to a second computer.

26. The package of data of claim 21, further comprising the act of instructing the computer to change the order of the ordered set of object definitions.

27. The package of data of claim 26, where the act of changing the order of the ordered set of object definitions includes reordering the object definitions so that each object is ordered before the definition of any object that references it.

28. The package of data of claim 21, where the act of storing object definitions includes storing the object definitions so that each object definition is ordered before the definition of any object that references it.

29. The package of data of claim 21, where the act of recursively retrieving object definitions for one or more database objects includes looking for references to the one or more database objects in a data dictionary.

30. The package of data of claim 21, where the object definition for the view is qualified with the containing database identifier in response to a deviation from a default condition.

31. A method for retrieving a database view object structure, comprising the steps of:
   inputting definition language specifying a database view identifier and with at least one directly or indirectly referenced database object unqualified with a containing database identifier;
   inputting a qualified show statement that identifies the database view identifier; and
   outputting the definition language with each directly or indirectly referenced database object qualified with its containing database identifier.

32. The method of claim 31 where the show statement includes an option indicator.

33. The method of claim 32 where the option indicator is qualified.

* * * * *